Nov. 17, 1970  H. W. ARNOLD ET AL  3,540,956
PRECISE CONDUCTOR CABLES
Original Filed Dec. 7, 1967

INVENTORS
Howard W. Arnold
BY Wilbert L. Gore
C. H. Mortenson
ATTORNEY

United States Patent Office 3,540,956
Patented Nov. 17, 1970

1

3,540,956
PRECISE CONDUCTOR CABLES
Howard W. Arnold and Wilbert L. Gore, Newark, Del., assignors to W. L. Gore & Associates, Inc., Newark, Del., a corporation of Delaware
Original application Dec. 7, 1967, Ser. No. 688,802. Divided and this application Apr. 11, 1968, Ser. No. 740,788
Int. Cl. H01b 13/06
U.S. Cl. 156—54                               12 Claims

ABSTRACT OF THE DISCLOSURE

A multi-conductor cable is provided in a continuous fashion by preforming grooves in a tape in a precise manner so that each groove is precisely spaced apart from its adjacent groups at the same distance throughout the length of the tape and placing a conductor in a respective groove and completing the encapsulation by laying a tape over said conductors and pressing the resultant assembly to press the tape material between conductors into webs.

DISCLOSURE

This invention relates to a process for positioning articles to be coated in the coating material. More particularly, it relates to a process for the production of cables in which the electrical conductors are precisely positioned.

This is a division of application Ser. No. 688,802, filed on Dec. 7, 1967 (now abandoned), which in turn was a refiling of application Ser. No. 494,127, filed on Oct. 8, 1965, and now abandoned.

Ribbon cables are being used in increasing quantities in applications where weight and volume reductions are important. They are prepared using round, flat strip or flat stranded conductors, and the conductors are coated with an insulation material such as poly(tetrafluoroethylene) and other fluorocarbon polymers, polyester laminates, polyamides and polyurethane. In the cable the individual conductors run side-by-side longitudinally. They are placed in this relationship by passing the plurality of conductors between two surfaces, sheets or similar continuous bodies of the insulating polymer to and through the nip of two pressure rolls. The rolls are grooved and as each wire and the insulation around it passes through its given groove the insulation material adjacent to the wire is pressed together by ridges in the rolls adjacent to the grooves. A connecting web is produced, and the conductors emerge from the exit side of the rolls as a unit cable. Processes and products of this kind are described in the Robert W. Gore patent U.S. 3,082,292 with particular reference to cables in which tetrafluoroethylene polymers are used as the insulating material. While the products and processes of the patent are outstanding, the ever-increasing demand for space and weight reductions coupled with precise control has made a precise positioning of the conductors in the cable a desirable attainment.

Accordingly, an aim of this invention is the provision of a process for precisely positioning conductors in a cable. Another purpose is providing a method for placing each conductor into a stable position with respect to the insulation prior to the calendering and maintaining the fixed position during calendering. A still further objective is the provision of apparatus for the production of a multiconductor cable in which each conductor is in an identical relationship with the other conductors throughout the length of the cable. These and other purposes of this invention will appear hereinafter.

The objectives of this invention are accomplished by forming a groove in insulating material for each conductor, feeding each conductor to its given groove and then passing the conductor lying in the groove and with insulation above it to the grooved calender rolls where the connecting webs are produced. While these steps can be accomplished separately, it is preferred to carry out the process simultaneously. Thus, a grooving roll system is used in which insulating tape is passed to the bight of two rolls one of which contains embossed ridges that run circumferentially around the roll and that conform to the shape of the conductor that is to go into the groove being prepared. The other roller contains recesses which receive the embossments, the tape passing between the embossments and the recesses and being pressed by the embossments to form the groove. The groove immediately, or practically so, receives the conductor, and this assembly is passed to the bight formed by the said recess containing roller and a third calender roller like it. These are rotating so that the recesses in one are precisely aligned with the recesses in the other and so that the ridges adjacent thereto meet and press the grooved tape in its ungrooved areas with a second tape being simultaneously fed to the said second bight by the third roller. This invention will be further understood by a reference to the description below and to the drawings all of which is not limitative but is given for illustrative purposes only, the drawings being as follows:

Figure 1:
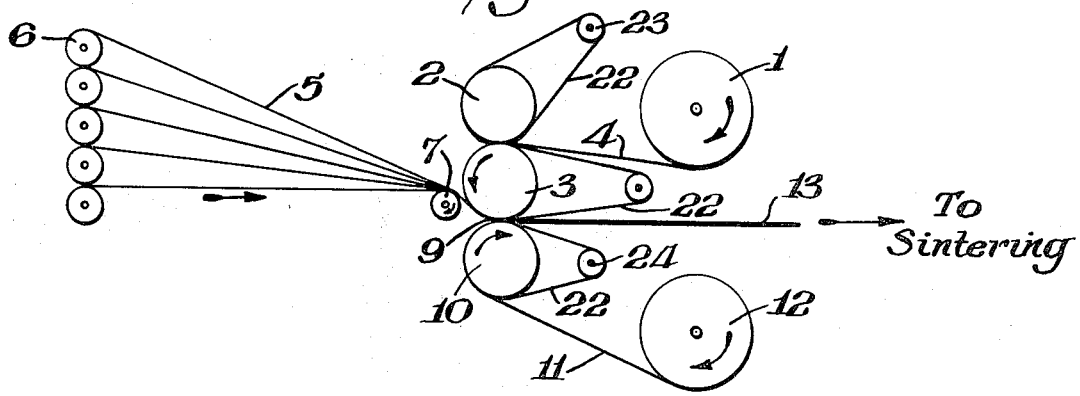
FIG. 1 is a schematic or a side view of the process and apparatus.

As can be seen in FIG. 1, a source of insulating tape is being fed from spool 1 to the bight of grooving roll 2 and calendering roll 3. In passing through this nip the tape 4 is pressed as described below with the production of a plurality of grooves. For each of these grooves there is a conductor 5 coming from a spool 6. In FIG. 1 there are five conductors shown each coming from its spool. These may be wires, flat strips or flat stranded or mixtures. A wire will generally pass to an arcuate groove; a flat strip will usually pass to a rectangular groove. Each of the conductors is passed over a conductor guide 7. This together with the positioning of spools 6 directs each of the conductors to its respective groove, the tape 4, now grooved, being moved by roller 3 over which it is passing. The placement of the conductors in the pregroove occurs at a point 8 just a bit before the nip 9. This nip is formed between calender roll 3 and calender roll 10. At the same time the assembly comprising the pregrooved tape 4 with conductors 5 is passing to nip 9, a second tape 11 from source 12 is being passed to nip 9. Thus, the conductors 6 are made to lie between two sheets and the grooving or encapsulating is completed when the assembly passes through nip 9. Also, the calender rolls 3 and 10 press the tape sections that do not cover a conductor together to form the connecting webs that hold the insulators together as a cable. The laminated cable 13 emerges from the exit side of the nip 9 and is passed to an oven for sintering if poly(tetrafluoroethylene) is the insulating material and/or to wind-up or storage for shipment.

With the conductor already positioned where desired before going through the nip 9, the wires stay in place. They do not move to one side or the other and the pulling action of the nip on the assembly has no adverse effects. Previously, the distance between two wires would vary along the cable length, and problems arose in slitting the cable when desired and in forming terminals. By the process of this invention those problems are eliminated.

Figure 2:
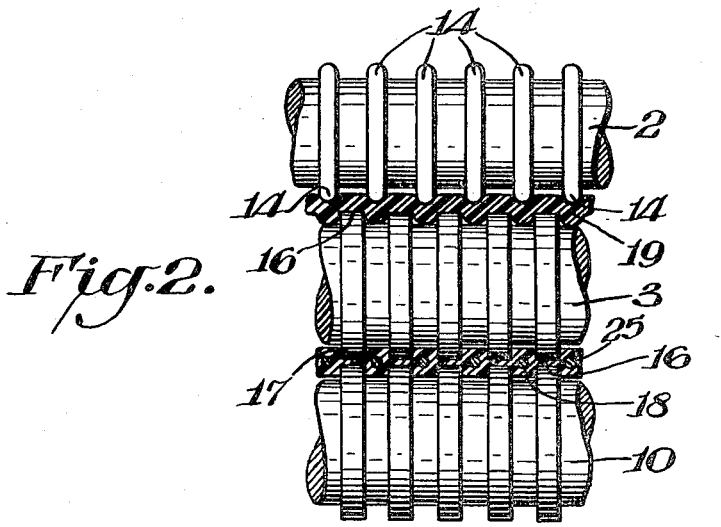
FIG. 2 is a cross-sectional detail showing the grooves, recesses and the like on each of the rolls and their relationship to each other.
Figure 3:
FIG. 3 is a cross-sectional view of the grooved tape.

The groove formation and the lamination are further understood by reference to FIG. 2 which shows the arrangement of the various grooves and ridges, the view being fragmentary to show only the contour of circumference of the given roll and the position of the tapes and insulators. It can be seen that embossments 14 on roll 2 are aligned with recesses 15 in roll 3. Thus, the tape 4 which passes between rolls 2 and 3 is pressed on by the embossments 14 and the ridges 16, and a groove is formed at each pressing. This is shown by the cross-section 19 of the tape 4 that is in the bight of rollers 2 and 3. The embossments 14 have pushed into the tape so that when the tape leaves the bight it will have grooves 20 in it and protruding sections 21 on the opposite side. As the grooved tape comes to guide 7 it presents the grooves 20 to the respective wires 5 and the protruding sections remain in the respective recesses 15 of roll 3, the protrusions being marked 21.

It is to be noted that ridges 16 of recesses 15 are aligned with ridges 17 of recesses 18 of rollers 10. A clearance is set between ridges 16 and 17 so that tapes 4 and 11 which meet at these places are pressed together to the extent desired. For example, using tapes that are 0.004 inch in thickness a clearance of 0.003 inch is provided, thus effecting a reduction of thickness in the resultant pressing to produce the web of 0.003 inch. Further, it is to be understood that the tape 4, now grooved, with conductors riding in respective grooves passes to nip 9 with tape 11 so that each conductor with tape all around it is passing through the openings or passageways formed by recesses 15 of roll 3 with aligned recesses 18 of roll 10. For convenience the assembly of conductor and tapes is shown in FIG. 2 and for convenience rectangular recesses are shown with round conductors. The resultant cable 25 is shown in cross-section in FIG. 4. In other experiments rectangular embossments are used that produce grooves that accommodate flat conductors, but any size or shape may be used. In the passage pressure is generally applied against the tapes to push them hard against the contacting conductor surfaces. The resultant cable is a strongly united assembly and it can be stored, shipped and handled in many ways and frequently even though the polymeric material may be unsintered.

This invention is further illustrated by the following examples which are given for illustrative purposes only.

Example I

Five AWG 33 wires on individual spools are led to wire guide 7. The wires are approximately 0.007 inch in diameter and as they leave the guide each is placed in a groove in tape 4. The tape 4 is an unsintered poly(tetrafluoroethylene) sheet that is 0.008 inch thick and it is passed between rolls 2 and 3. The grooving element on roll 2 is such that a groove is produced in tape 4 that is 0.005 inch wide and 0.005 inch deep.

Figure 4:
FIG. 4 is a cross-sectional view of a cable produced by this invention.

The shape of the grooved tape can be seen in FIG. 2 where the indented, plastic tape 19 is shown between the bight of rollers 2 and 3. As the indented tape comes to the area 8 between guide 7 and roll 3, it presents an indentation 20 to each of the given wires 5 and the protrusion 21 will be in the given groove 15 as shown in FIG. 2. Where the ridges 16 and 17 of rolls 3 and 10 meet, the plastic tape there between is pressed together to form the web. The construction produced is shown in FIG. 4.

Example II

The above procedure is repeated using the thermoplastic polymer being a fluorinated ethylene propylene polymer, commonly called "FEP." Using such a thermoplastic material the temperature of the tape to be grooved and the temperature of the grooving roll is carefully controlled. The film is heated to a temperature at which it is somewhat soft and somewhat plastic, but at which it is not fluid nor sticky. For the "FEP" film this temperature is between 250° C. and 270° C. The grooving rolls are kept at this temperature or somewhat cooler. The heating means that is used is not shown in the drawings for convenience and can be any desirable heater. Grooving is effected as described in Example I and when the two sheets pass through the bight between rolls 3 and 10, they are heated further and pressed together in the bight of the rolls where ridges 16 and 17 are acting as the pressure elements.

The heating of the films is controlled by the temperature of roll 3, by adjusting the length of contact of the film with this roll and by adjusting the rate of the revolution of the rolls. Pre-heating means can be applied such as the use of infrared lamps, glow bars or other means, and these speed up the operation. Roll 10 is preferentially heated to a considerable higher temperature than roll 3 since this facilitates the heat sealing of the thermoplastic films. Again the product that is produced has a structure such as that shown in FIG. 4.

In a second modification films 22 of poly(tetrafluoroethylene) are fed to the rolls 2 and 10 by rolls 23 and 24, respectively, so that they lie in direct contact with the heated rolls and the "FEP" films lie on top of and ultimately between the poly(tetrafluoroethylene) films. By this arrangement any sticking of the thermoplastic "FEP" to the rolls is prevented. Further, if desired, the assembly that is produced will be the construction 25 shown in FIG. 4 but having a poly(tetrafluoroethylene) sheet lying above it and below it. This is done by feeding the poly(tetrafluoroethylene) tapes 22 so that they do not return immediately to their respective rollers (22, 22a, 24) but pass through the nip with assembly 13, spools like 1 and 12 being used to feed the tapes 22. Other thermoplastic films such as polyethylene, polypropylene, and poly(ethylene terephthalate) are processed in a like manner with the production of cables. The resultant assembly has the added advantage that the thermoplastic sheets are held together until the construction has cooled and hardened. The poly(tetrafluoroethylene) sheets separate readily from the construction, and they can be passed in a continuous manner back to the rolls which they covered.

The insulating material used in this invention may be selected from a wide variety of materials including tetrafluoroethylene polymers and copolymers such as poly(tetrafluoroethylene), tetrafluoroethylene/monochlorotrifluoroethylene polymers, tetrafluoroethylene/hexafluoropropylene polymers, polyethylene, fluorinated hydrocarbon polymers, polymonochlorotrifluoroethylene, polyamides, polyimides, polymerized epsilon-caprolactam, polyformaldehyde, polyurethanes, polyesters such as polyethylene glycol/terephthalic acid esters, among others. Generally thermoplastic materials are heated, and the rolls may be heated also. However, when processing poly(tetrafluoroethylene), preferred insulation material, no heat is used because the welding step that produces the web is effected by pressing unsintered polymer with unsintered polymer. In any event the assembly comprising the grooved tape with conductors lying in it can be stored and shipped as is as can the assembly comprising the grooved tape, the wires and the second tape, but it is preferred to exert the pressure to form the unitary assembly 13 right away. The second tape may also be grooved but generally grooving only the one tape is done since this is adequate to accomplish the precise conductor alignment desired.

Cables with unsintered poly(tetrafluoroethylene) in them are sent to a heat source, not shown, where they are heated at a bit above 327° C., usually between 330° C. and 430° C., to effect the sintering of the polymer. The heating time is quite short being usually only a few seconds but may be as much as 30 minutes.

The insulating materials used need not be of the same chemical composition. Thus, the tapes may be laminates such as polyethylene/polyethyleneterephthalate films. Further, the tapes 4 and 11 may differ in composition though generally it is preferred that they be made from the same polymeric materials. One tape may be of a different color than the other, and color-coded cables may be produced.

The articles that are encapsulated include wires, rods, strips, screen and similar items. The cables may be symmetrically arranged—that is, all conductors are of the same size and shape. However, unsymmetrical cables may be produced, for the uniform spacing between conductors is still attained by the process of this invention. Thus, it is apparent that the shapes and sizes of the grooves, recesses and ridges on the rolls may be widely varied and include slots, circles, rectangles, squares, hexagonal, diamond and other shapes.

While the invention has been described with particular reference to grooved rolls 3 and 10, these need not be grooved and either or both may be flat. This is particularly true when small, round or thin, flat conductors are being used.

By the process and use of the apparatus of this invention cables are produced in which the conductors are separated by distances that are uniform all along the cable. This means that the amount of insulating material between adjacent conductors is constant and high quality dielectric properties are maintained along the entire length of the cables. Further, when one wishes to slit the cable or strip off insulation at one end he may do so without ever cutting into a conductor. The built-in precision provides a new cable which allows one to bundle large amounts of cable in a precise, efficient manner with continuous reproducible results and without loss of time and materials.

We claim:

1. A process for forming grooves in an insulating tape so that each groove is longitudinally precisely spaced apart from adjacent grooves at the same distance throughout the length of the tape and for precisely placing a conductor in a respective groove for subsequent encapsulation which process comprises passing a tape of an insulating material to and through the nip formed by a first pressure roll and a second pressure roll which rolls comprise a groove-forming means thereby forming a groove in said tape; passing the resultant grooved tape with aligned conductors to and through a second nip which is a calendering nip and is formed by said second roll and a third pressure roll, each conductor to be encapsulated being made to lie in its respective groove before said calendering nip and made to stay in its said groove as it passes through said calendering nip; simultaneously feeding a second tape to said calendering nip to cause said conductor so positioned in said groove to be covered by said second tape; and exerting pressure on the resultant assembly as it passes through said calendering nip thereby welding the insulating material in said grooved tape with the insulating material in said second tape where they contact each other in said passage through said calendering nip.

2. A process in accordance with claim 1 in which said insulating material is unsintered poly(tetrafluoroethylene).

3. A process in accordance with claim 1 in which said groove in said grooved tape is formed by passing the tape to be grooved through the nip of a pair of pressure rolls one of which has an embossed continuous bead running circumferentially around it which bead has outside diameters conforming to the dimensions desired in the groove.

4. A process in accordance with claim 1 in which the conductor is circular.

5. A process in accordance with claim 1 in which said conductor is flat.

6. A process in accordance with claim 1 in which a plurality of grooves is simultaneously formed in the tape to be grooved.

7. A process in accordance with claim 6 in which a plurality of conductors is fed using a tape containing a plurality of grooves, each conductor being fed to a respective groove.

8. A process in accordance with claim 1 in which the insulating material in the resultant encapsulated conductor is heated.

9. A process in accordance with claim 1 in which the insulation is unsintered poly(tetrafluoroethylene) which is subsequently sintered.

10. Apparatus for continuously forming grooves, running longitudinally in a tape of insulating material, in a precise manner so that each groove is precisely spaced apart from its adjacent grooves at the same distance throughout the length of the tape and for placing a conductor in a respective groove to form a multi-conductor cable which apparatus comprises three rolls being (1) a first roll having a plurality of embossments running circumferentially around it, as opposed to longitudinal positioning, and being aligned to ride above recesses of the second roll, (2) a second roll having recesses and ridges, said recesses being aligned with said embossments of said first roll to afford a nip that forms grooves placed in and running longitudinally in any said tape being passed between said first and second rolls and said recesses being aligned with similar recesses in the third roll, and (3) a third roll contoured like the second roll with recesses and ridges aligned with the recesses and ridges, respectively of said second roll to afford a calendering or pressing action on materials passing therethrough; and means for feeding a tape of insulating material to said groove-forming nip formed by roll (1) and roll (2) and for feeding the resultant grooved tape to and through said calendering nip formed by roll (2) and roll (3).

11. Apparatus in accordance with claim 10 which includes means for passing a second tape to and through said calendering nip to lie above and to encapsulate said conductor.

12. Apparatus in accordance with claim 11 which includes means for feeding a conductor, to be encapsulated, to its respective groove in said grooved tape before reaching said calendering nip formed by said second and said third rolls, thus making said conductor lie precisely in its respective groove during its passage with said grooved tape through said calendering nip.

References Cited

UNITED STATES PATENTS

| | | | |
|---|---|---|---|
| 1,184,748 | 5/1916 | Hicks | 156—472 X |
| 2,361,374 | 10/1944 | Abbott | 174—117.1 |
| 3,082,292 | 3/1963 | Gore | 156—55 X |
| 3,271,214 | 9/1966 | Tabor | 156—52 |

VERLIN R. PENDEGRASS, Primary Examiner